United States Patent
Huang et al.

(10) Patent No.: US 9,473,034 B2
(45) Date of Patent: Oct. 18, 2016

(54) ISOLATED POWER CONVERTER AND SWITCHING POWER SUPPLY USING THE SAME

(71) Applicant: Silergy Semiconductor Technology (Hangzhou) Ltd., Hangzhou (CN)

(72) Inventors: Qiukai Huang, Hangzhou (CN); Zhiliang Hu, Hangzhou (CN); Xinlei Li, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 55 days.

(21) Appl. No.: 14/600,996

(22) Filed: Jan. 20, 2015

(65) Prior Publication Data

US 2015/0207422 A1 Jul. 23, 2015

(30) Foreign Application Priority Data

Jan. 20, 2014 (CN) .......................... 2014 1 0024218

(51) Int. Cl.
*H02M 3/335* (2006.01)
*H02M 1/00* (2006.01)
*H02M 1/34* (2007.01)

(52) U.S. Cl.
CPC . *H02M 3/33523* (2013.01); *H02M 2001/0006* (2013.01); *H02M 2001/0009* (2013.01); *H02M 2001/348* (2013.01)

(58) Field of Classification Search
CPC ............... H02M 3/33515; H02M 3/33576; H02M 3/33592; H02M 3/33523; H02M 3/10; H02M 1/081
USPC .......................... 363/21.12–21.15, 123, 125
See application file for complete search history.

(56) References Cited

U.S. PATENT DOCUMENTS

2004/0257833 A1\* 12/2004 Yang ................. H02M 3/33507
363/16
2012/0281439 A1 11/2012 Polivka et al.

FOREIGN PATENT DOCUMENTS

CN 1806381 A 7/2006
CN 103236787 A 8/2013

OTHER PUBLICATIONS

First Office Action, including search results, for Chinese Patent Application No. 201410024218.0, dated Aug. 5, 2015, 7 pages.

\* cited by examiner

*Primary Examiner* — Adolf Berhane
*Assistant Examiner* — Afework Demisse
(74) *Attorney, Agent, or Firm* — Westman, Champlin & Koehler, P.A.

(57) ABSTRACT

Disclosed are an isolated power converter and a switching control signal using the same. In the isolated power converter, the positions of the power switch and the primary winding are exchanged, and the feedback voltage detection and secondary current zero-crossing detection are carried out in accordance with the voltage across the primary winding. Thus, primary side control can still be implemented without employment of an auxiliary winding.

18 Claims, 9 Drawing Sheets

ISOLATED POWER CONVERTER AND SWITCHING POWER SUPPLY USING THE SAME

CLAIM OF PRIORITY AND CROSS-REFERENCE TO RELATED APPLICATION(S)

This application claims the benefit of Chinese Patent Application No. 201410024218.0, filed on Jan. 20, 2014, which is incorporated herein by reference in its entirety.

BACKGROUND OF THE INVENTION

1. Field of the Invention

The present invention relates to the field of power electronics, and more particularly, to an isolated power converter without any auxiliary winding and a switching power supply using the same.

2. Description of the Related Art

Isolated power converters are widely used in various kinds of off-line power supply systems. An isolated power converter typically comprises primary side circuit and secondary side circuit, which are isolated from each other by a transformer with a primary winding and a secondary winding.

The isolated power converter controls a current through the primary winding by turning on and off a power switch, so as to output a substantially constant voltage and/or current in the secondary side circuit. For the purpose of power switch control, feedback values related to an output voltage or other parameters of the power converter are required. In the prior art, some isolated power converters obtain the feedback values by employing an auxiliary winding in the transformer. However, manufacture process of the auxiliary winding is complicated, which would result in rise in cost and a high manufacturing effort. In addition, the auxiliary winding has a large size, so the isolated power converter with an auxiliary winding occupies quite some area on the circuit board and lead to a large size of the circuit board. Meanwhile, the auxiliary winding may introduce EMI to the circuit.

BRIEF DESCRIPTION OF THE INVENTION

In view of this, the purpose of the present disclosure is to provide an isolated power converter and a switching power supply using the same to control the isolated power converter at the primary side without employment of an auxiliary winding.

In one embodiment, there is provided an isolated power converter comprising a transformer with a primary winding and a secondary winding; a secondary rectifier coupled with the secondary winding; a power switch and a current sampling circuit coupled in series between an input power source and a first terminal of the primary winding, wherein a second terminal of the primary winding is coupled with a ground, wherein the current sampling circuit is configured to sample a current through the power switch to output a current detection signal; a voltage feedback circuit coupled in parallel with the primary winding and configured to output a feedback voltage in accordance with a voltage across the primary winding; a bias voltage generating circuit coupled with the input power source and configured to provide a bias voltage for the control circuit; and a control circuit configured to output switching control signal in accordance with the current detection signal and the feedback voltage; wherein, both ground terminals of the control circuit and the bias voltage generating circuit are coupled with the first terminal of the primary winding.

Preferably, a first terminal of the power switch is coupled with the input power source, wherein the current sampling circuit is coupled between a second terminal of the power switch and the first terminal of the primary winding.

Preferably, the current sampling circuit comprises a resistor, wherein the current detection signal is outputted at a common terminal coupling the resistor and the power switch.

Preferably, the current sampling circuit is coupled between the input power source and a first terminal of the power switch, wherein a second terminal of the power switch is coupled with the first terminal of the primary winding.

Preferably, the current sampling circuit comprises a resistor, wherein a voltage drop across the resistor is adopted as the current detection signal.

Preferably, the bias voltage generating circuit comprises a capacitor coupled between an output terminal and the ground terminal of the bias voltage generating circuit and a charging controller coupled between the output terminal and the input power source.

Preferably, the bias voltage generating circuit further comprises a resistor coupled between the input power source and the output terminal.

Preferably, the bias voltage generating circuit and the control circuit are integrated as a self-powered integrated circuit; or the bias voltage generating circuit, the control circuit and the power switch are integrated as a self-powered integrated circuit.

Preferably, the charging controller and the control circuit are integrated as a self-powered integrated circuit; or the charging controller, the control circuit and the power switch are integrated as a self-powered integrated circuit.

In another embodiment, there is provided a switching power supply comprising a rectifier bridge and an isolated power converter as mentioned above.

In the present disclosure, the positions of the power switch and the primary winding are exchanged, and the feedback voltage detection and secondary current zero-crossing detection is carried out in accordance with the voltage across the primary winding. Thus, the auxiliary winding is omitted. Furthermore, the advantages of simplified manufacture process, low cost, small size of the circuit, and enhanced electromagnetic compatibility are achieved.

BRIEF DESCRIPTION OF THE DRAWINGS

The implementations of the disclosure are illustrated in the drawings. The drawings and implementations provide some embodiments of the disclosure non-exclusively without limitation, wherein.

DETAILED DESCRIPTION OF EMBODIMENTS OF THE INVENTION

Reference will now be made in detail to particular embodiments of the disclosure, examples of which are illustrated in the accompanying drawings. However, the present disclosure is intended to encompass any substitutions, modifications, equivalents, etc., made thereto without departing from the spirit and scope of the present disclosure. In the description below, a number of particular details are explained to provide a better understanding to the disclosure. However, it is apparent to those skilled in the art the disclosure can be implemented without these particular details. In other instances, well known circuits, materials or methods are not described so as not to obscure the aspects of the present disclosure.

In addition, it is to be understood that the drawings are only for illustration purpose, and these drawings are not necessarily drawn to scale.

It is to be understood by those skilled in the art that the term "circuit" refers to an electrical network that has a closed loop consisting of at least one electronic component or sub-circuit connected through electronic interconnections or electromagnetic interconnections. Also, it is to be understood that when an element or a circuit is referred to as being "connected to," or "coupled to" another element, or "coupled between" two terminals, it may be directly connected or coupled to the other element, or intervening elements may be present. Two elements may be connected to each other physically, electronically, logically, or in any other manner, through one or more additional elements. In contrast, when an element is referred to as being "directly connected to," or "directly coupled to" another element, there may be no intervening elements present. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to."

In the description below, terms such as "first," and "second," are used herein for purposes of description and are not intended to indicate or imply relative importance or significance. In addition, unless the context clearly requires otherwise, term "a plurality of" is to be construed as "more than two".

Although the spirit of the present disclosure may be implemented to all kinds of isolated power converter topologies, the principle of the present disclosure is illustrated with an exemplary flyback converter in the description below.

Figure 1:
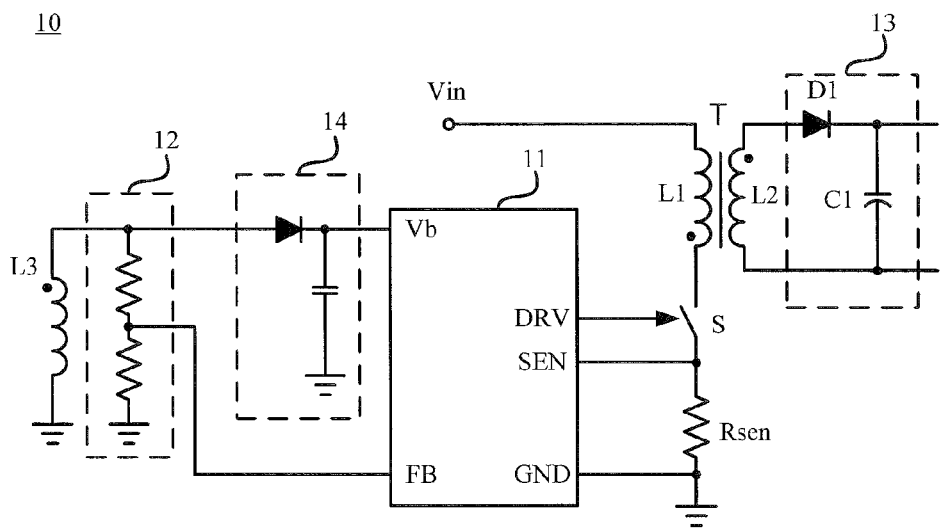
FIG. 1 is a schematic diagram of an isolated power converter with an auxiliary winding in the prior art.

FIG. 1 is a schematic diagram of an isolated power converter with an auxiliary winding in the prior art. As shown in FIG. 1, isolated power converter 10 comprises transformer T, power switch S, control circuit 11, voltage feedback circuit 12, secondary rectifier 13, bias voltage generating circuit 14 and resistor Rsen. Transformer T comprises primary winding L1, secondary winding L2 and auxiliary winding L3. Secondary winding L2 and auxiliary winding L3 are both coupled with primary winding L1 Secondary rectifier 13 is coupled with secondary winding L2 and configured to rectify a voltage across secondary winding L2 to output a substantially constant voltage. Secondary rectifier 13 comprises diode D1 and capacitor C1. Wherein, bias voltage generating circuit 14 is coupled with auxiliary winding L3 and configured to rectify a voltage across auxiliary winding L3 to output a substantially constant bias voltage to power control circuit 11. Control circuit 11 comprises first input terminal Vb, second input terminal SEN, third input terminal FB, ground terminal GND and output terminal DRV. An output terminal of bias voltage generating circuit 14 is coupled with first input terminal Vb. Resistor Rsen samples the current through the power switch to output a voltage signal. Resistor Rsen has a terminal away from the ground which is coupled with second input terminal SEN of control circuit 11. Voltage feedback circuit 12 is a voltage dividing resistor loop coupled in parallel with auxiliary winding L3. Voltage feedback circuit 12 divides a voltage across auxiliary winding L3 into a feedback voltage to be inputted to third input terminal FB of control circuit 11. Typically, control circuit 11 may be an integrated circuit, and other parts of isolated power converter 10 adopt discrete components with which periphery circuits of the integrated circuit are constructed.

However, manufacture process of the auxiliary winding is complicated, which would result in rise in cost and a high manufacturing effort. In addition, the auxiliary winding with a large size lead to a large size of the circuit board. Furthermore, the auxiliary winding may introduce EMI to the circuitry. Although there are some integrated circuits which integrate the bias voltage generating circuit and can power control circuit 11 without employment of auxiliary winding L3, the auxiliary winding is still necessary for the isolated power converter in the prior art since feedback voltage is still obtained from auxiliary winding L3.

Figure 2A:
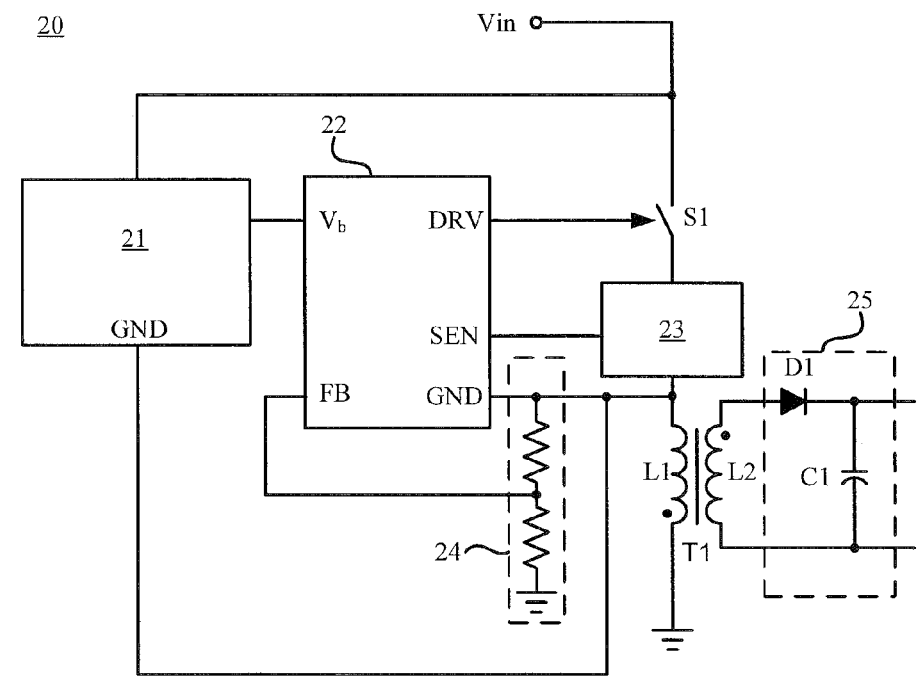
FIG. 2A is a schematic diagram of an isolated power converter in accordance with a first embodiment of the present disclosure.

FIG. 2A is a schematic diagram of an isolated power converter in accordance with a first embodiment of the present disclosure. As shown in FIG. 2A, isolated power converter 20 comprises transformer T1, power switch S1, bias voltage generating circuit 21, control circuit 22, current sampling circuit 23, voltage feedback circuit 24 and secondary rectifier 25. Transformer T1 comprises only primary winding L1 and secondary winding L2 coupled with each other and excludes the auxiliary winding. Secondary rectifier 25 is coupled with secondary winding L2.

Power switch S1 and current sampling circuit 23 are coupled in series between input power source Vin and a first terminal of primary winding L1. A second terminal of primary winding L1 is coupled with the ground. Current sampling circuit 23 samples a current through power switch S1 to output current detection signal Vsen.

In the present embodiment, power switch S1 may be any controlled semiconductor switch device such as MOSFET (Metal Oxide Semiconductor Field Effect Transistor). When power switch S1 adopts a MOSFET, a first terminal of power switch S1 may be a drain of the MOSFET, and a second terminal of power switch S1 may be a source of the MOSFET.

Voltage feedback circuit 24 is coupled between the first terminal and the second terminal of primary winding L1 and configured to output a feedback voltage in accordance with a voltage across primary winding L1.

Figure 2B:
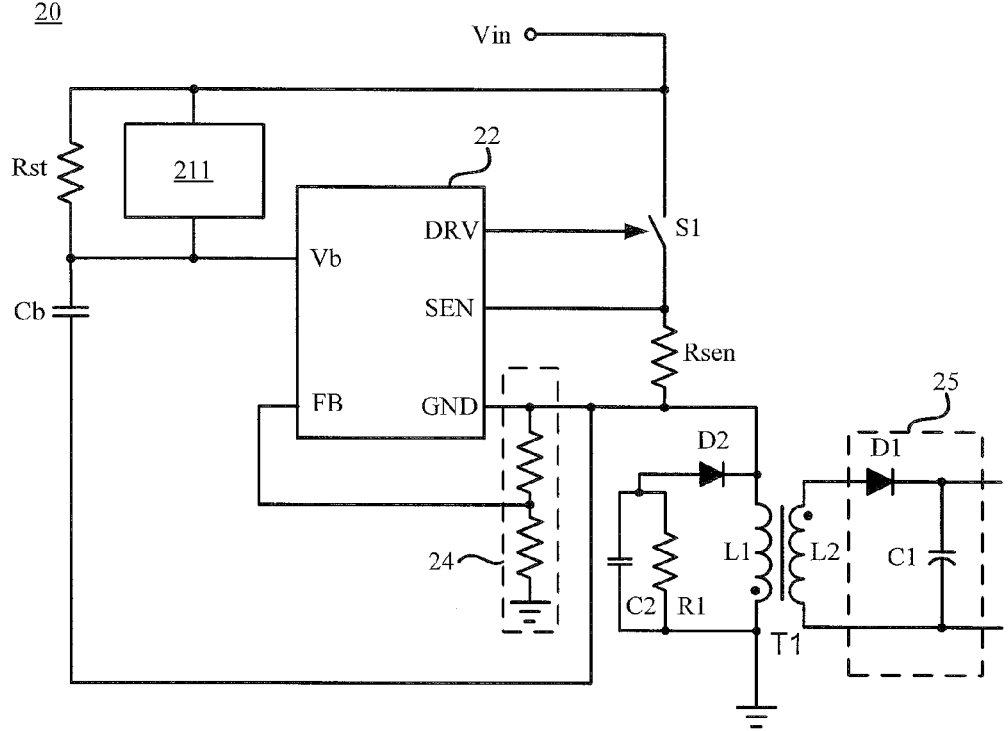
FIG. 2B is a schematic diagram of an isolated power converter in accordance with a preferable implementation of the first embodiment.

Preferably, as shown in FIG. 2B, the isolated power converter in accordance with the present embodiment may further comprise a RCD snubber coupled in parallel with primary winding L1 which is configured to absorb the energy leaked by leakage inductance of the primary winding to prevent the power switch from sustaining a high reverse spike. The RCD snubber comprises diode D2, resistor R1 and capacitor C2.

Diode D2 is coupled between the first terminal of primary winding L1 and an intermediate terminal of the RCD snubber. Resistor R1 and capacitor C2 are coupled in parallel between the intermediate terminal of the RCD snubber and the second terminal of primary winding L1.

It is to be understood by those skilled in the art that the RCD snubber mentioned above may not be necessary, and there are a variety of circuit configurations. Those skilled in the art may deter mine whether adopt a RCD snubber in the isolated power converter and further select its circuit configuration and parameters in accordance with practical application.

Output terminals of current sampling circuit 23 and voltage feedback circuit 24 are respectively coupled with second input terminal SEN and third input terminal FB of control circuit 22.

Bias voltage generating circuit 21 is coupled with input power source Vin and configured to generate the bias voltage to power control circuit 22.

Preferably, as shown in FIG. 2B, bias voltage generating circuit 21 comprises capacitor Cb and charging controller 211 coupled therewith. Capacitor Cb is coupled between an output terminal and a ground terminal of bias voltage generating circuit 21. The ground terminal of bias voltage generating circuit 21 is coupled with the first terminal of primary winding L1. Charging controller 211 is coupled between the output terminal of bias voltage generating circuit 21 and the input power source. Charging controller 211 utilizes the DC bus voltage (i.e. the input power source) to charging capacitor Cb, so that bias voltage Vb for powering control circuit 22 is generated at the output terminal of bias voltage generating circuit 21.

More preferably, as shown in FIG. 2B, bias voltage generating circuit 21 may further comprises resistor Rst. Capacitor Cb may be coupled to the DC bus by resistor Rst, which enables the energy from the DC bus to be utilized to charge capacitor Cb through resistor Rst to obtain bias voltage Vb powering control circuit 22 when the control circuit need to be started.

In the present embodiment, as shown in FIG. 2A, the first terminal of power switch S1 is coupled with the input power source, and current sampling circuit 23 is coupled between the second terminal of power switch S1 and the first terminal of primary winding L1.

Control circuit 22 comprises ground terminal GND coupled with the first terminal of primary winding L1.

Output terminal DRV of control circuit 22 is coupled with a control terminal of power switch S1, and control circuit 22 is configured to output switching control signal Q in accordance with the current detection signal and the feedback voltage. Switching control signal Q is configured to control on and off of power switch S1, so as to control the current through windings, which enables the secondary circuit of the isolated power converter to output a substantially constant voltage or current.

Preferably, current sampling circuit 23 comprises resistor Rsen. At the common terminal coupling resistor Rsen and power switch S1, the current detection signal is outputted. It is to be understood by those skilled in the art that current sampling circuit 23 may also adopt other circuit configurations such as a current transformer.

Voltage feedback circuit 24 is coupled in parallel with primary winding L1 and configured to output feedback voltage.

Preferably, voltage feedback circuit 24 is a voltage dividing resistor loop coupled in parallel with primary winding L1.

It is to be understood by those skilled in the art that bias voltage generating circuit 21 may adopt any circuit configuration which generates the bias voltage without employment of an auxiliary winding.

The principle that enables the existing bias voltage generating circuit to be directly applied to the isolated power converter in accordance with the present disclosure will be described conjunction with FIGS. 3A and 3B.

Figure 3A:
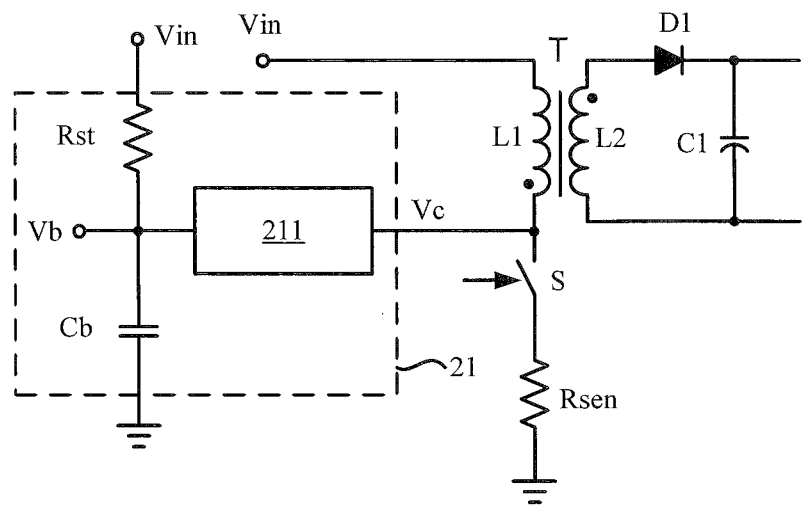
FIG. 3A is a schematic diagram of an isolated power converter with a bias voltage generating circuit coupled with a primary side circuit in the prior art.

FIG. 3A is a schematic diagram of an isolated power converter with a bias voltage generating circuit coupled with a primary side circuit in the prior art. As shown in FIG. 3A, input terminal Vc of bias voltage generating circuit 21 is typically coupled with the first terminal of a power switch in the primary circuit, i.e. a terminal coupling the power switch and the primary winding.

Particularly, bias voltage generating circuit 21 comprises charging controller 211 and capacitor Cb. Wherein, charging controller 211 is coupled with capacitor Cb and input terminal Vc and configured to utilize the energy from input terminal Vc to charge capacitor Cb.

Figure 3B:
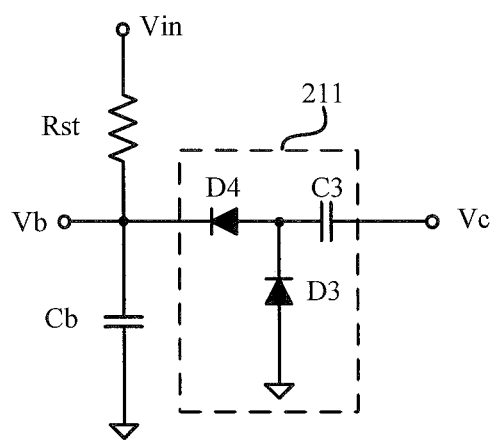
FIG. 3B is a schematic diagram of a bias voltage generating circuit adopted by circuit shown in FIG. 3A or circuit in accordance with the first embodiment of the present disclosure.

With respect to the bias voltage generating circuit shown in FIG. 3B, when power switch S is on, charging controller 211 executes a discharge operation, and when power switch S is off, charging controller 211 charges capacitor Cb to provide bias voltage Vb. Capacitor Cb is coupled with charging controller 211 in one terminal and coupled with the ground terminal of the bias voltage generating circuit in the other terminal. Preferably, capacitor Cb may be coupled to the DC bus (i.e. the input power source) by resistor Rst, which enables the energy from the DC bus to be used to charge capacitor Cb through resistor Rst to obtain bias voltage Vb powering and starting control circuit 22 when the isolated power converter need to be started. When a voltage across bias capacitor Cb is greater than an under-voltage lock-out threshold, control circuit 22 switches from an under-voltage lock-out state into a working state.

As shown in FIG. 3B, charging controller 211 may comprises an energy storage circuit, a discharging branch and a charging branch, wherein the energy storage circuit has one terminal coupled with power input terminal Vc (in FIG. 3B, power input terminal is coupled with the first terminal of power switch S) and the other terminal coupled with the discharging branch and the charging branch. When power switch S is on, the energy storage circuit is discharged through discharging branch, and when power switch S is off, the energy storage circuit charges capacitor Cb through charging branch. The voltage across capacitor Cb is bias voltage Vb. In the present embodiment, input terminal Vc is coupled with input power source Vin (i.e. the DC bus).

The discharging branch comprises diode D3, and the charging branch comprises diode D4. The energy storage circuit comprises capacitor C3 which has two terminals, wherein, one terminal coupled with the first terminal of power switch S1 (when adopting a MOSFET, the first terminal of a power switch is the drain of the MOSFET), and the other terminal is coupled with a cathode of diode D3 and an anode of diode D4. An anode of diode D3 is coupled to the ground terminal of the bias voltage generating circuit to provide a discharge current loop for capacitor C3. A cathode of diode D4 is coupled with the common terminal of resistor Rst and capacitor Cb, so as to ensure the energy flow from capacitor C3 to capacitor Cb in a one-way manner.

The bias voltage generating circuit shown in FIG. 3A can generate the bias voltage without employment of an auxiliary winding, which can be integrated with the control circuit as a self-powered integrated circuit. In accordance with FIGS. 3A and 3B, it is apparent that bias voltage generating circuit 21 utilizes a voltage drop across a series circuit consisting of the power switch and the current sampling circuit to generate bias voltage Vb.

As shown in FIGS. 2A and 2B, in the isolated power converter in accordance with the present embodiment, the ground terminal of bias voltage generating circuit 21 is coupled with the first terminal of the primary winding, so bias voltage generating circuit 21 operates in a floating mode. In the present embodiment, bias voltage generating circuit 21 is actually coupled between the input power source and the first terminal of the primary winding and utilizes a voltage drop across a series circuit consisting of the power switch and the current sampling circuit to generate bias voltage Vb. Furthermore, the ground terminal of control circuit 22 is coupled to the first terminal of the primary winding as well. Therefore, the bias voltage generating circuit shown in FIG. 3B may be directly applied to the isolated power converter in accordance with the present embodiment.

In accordance with the above description, it is to be understood by those skilled in the art that the bias voltage generating circuit is not limited to the circuit configuration mentioned above and may adopt any circuit suitable for fabricating in an integrated circuit and generating a bias voltage in accordance with the voltage drop across the power switch and the current sampling circuit.

Figure 4:
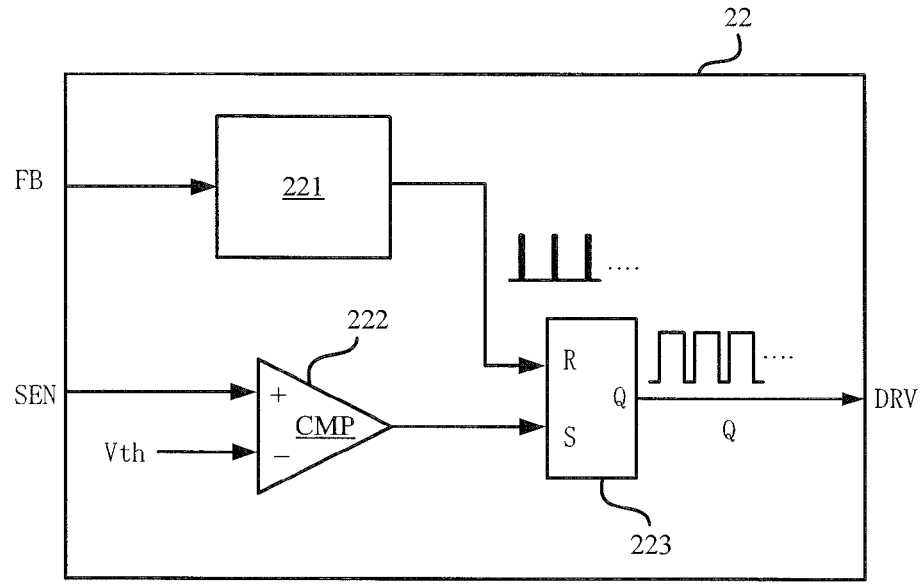
FIG. 4 is a schematic diagram of a control circuit in accordance with the first embodiment of the present disclosure.

Typically, as shown in FIG. 4, control circuit 22 may comprises switching frequency control circuit 221, peak current control circuit 222 and logic circuit 223. Wherein, switching frequency control circuit 221 outputs a switching frequency signal in accordance with the feedback voltage, and peak current control circuit 222 outputs a peak current control signal in accordance the current detection signal. Logic circuit 223 outputs the switching control signal in accordance with the switching frequency signal and the peak current control signal.

With respect to the present embodiment, current sampling circuit 23 outputs the current detection signal representing the current through the power switch, and voltage feedback circuit 24 feeds back the voltage across the primary winding proportional to the voltage across an auxiliary winding in the prior art. Thus, by configuring current sampling circuit 23 and voltage feedback circuit 24, the current detection signal and the feedback voltage inputted to control circuit 22 can represent the operation state of the isolated power converter. Therefore, similar to the bias voltage generating circuit, the control circuit in the prior art can be applied to the isolated power converter in accordance with the present embodiment without any modification.

Meanwhile, it is to be understood by those skilled in the art that control circuit 22 is not limited to the circuit configuration mentioned above and may adopt any circuit utilizing a feedback voltage and a current detection signal to implement primary side control.

In the present embodiment, the positions of the power switch and the primary winding are exchanged, and the feedback voltage detection and secondary current zero-crossing detection is carried out in accordance with the voltage across the primary winding. Thus, the auxiliary winding is omitted. Furthermore, the advantages of simplified manufacture process, low cost, small size of the circuit, and enhanced electromagnetic compatibility are achieved.

As mentioned above, in the present embodiment, bias voltage generating circuit 21, control circuit 22 and the power switch may adopt any existing circuit or electronic component suitable for chip fabrication. Thus, the isolated power converter in accordance with the present embodiment may utilize any existing integrated chip for isolated power converters. In other words, the isolated power converter may be constructed by using an integrated circuit with a bias voltage generating circuit and a control circuit or an integrated circuit with a bias voltage generating circuit, a control circuit, and a power switch, which are shown in FIGS. 5A and 5B respectively.

Figure 5A:
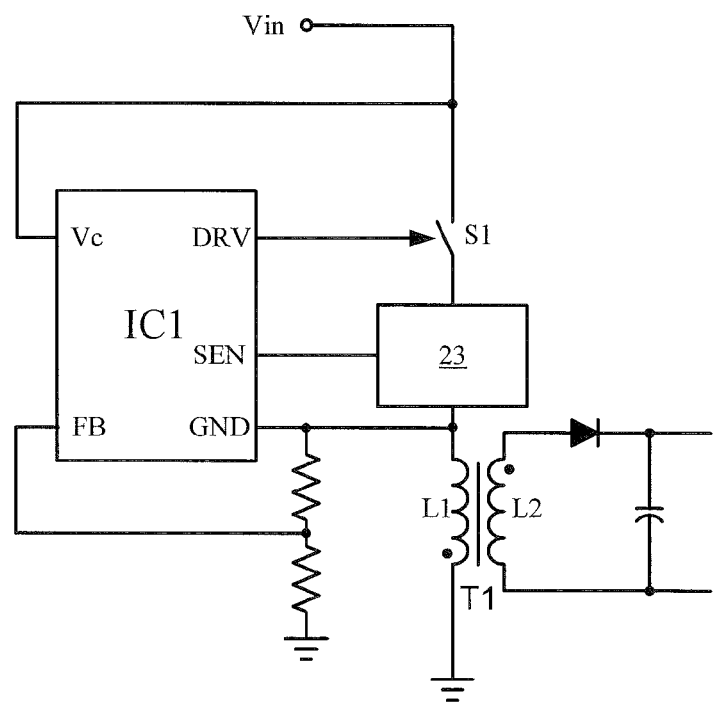
FIG. 5A-5D are schematic diagrams of isolated power converters constructed with integrated circuits in accordance with the first embodiment of the present disclosure.

As shown in FIG. 5A, integrated circuit IC1 with a bias voltage generating circuit and a control circuit comprises output pin DRV, first input pin Vc, second input pin SEN, third input pin FB and ground pin GND. Output pin DRV is coupled with control terminal of power switch S1. First input pin Vc is coupled with the DC bus, i.e. the input power source. Third input pin FB is coupled with the output terminal of the voltage feedback circuit. Second input pin SEN is coupled with the output terminal of the current sampling circuit. Ground pin GND is coupled with the first terminal of the primary winding. Wherein, first input pin Vc is coupled with the output terminal of the bias voltage generating circuit in integrated circuit IC1 to provide energy thereto.

Figure 5B:
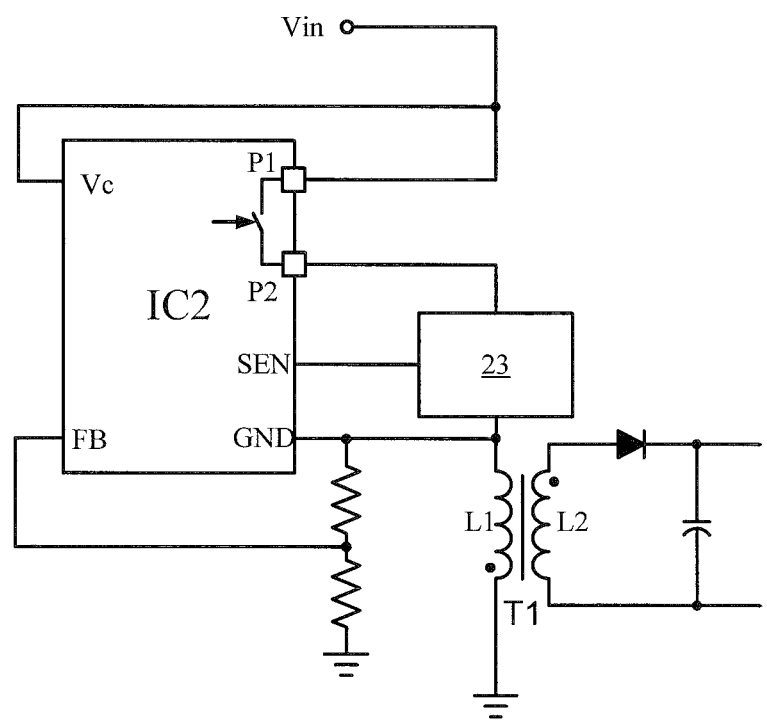

As shown in FIG. 5B, integrated circuit IC2 with a bias voltage generating circuit, a control circuit, and a power switch comprises power input pin P1, power output pin P2, first input pin Vc, second input pin SEN, third input pin FB, and ground pin GND. Second input pin SEN is coupled with the second terminal of the power switch in the integrated circuit, or power output pin P2 and second input pin SEN are encapsulated as a single pin. The isolated power converter adopts this kind of integrated circuits is shown in FIG. 5B, wherein power input pin P1 is coupled to the input power source. First input pin Vc is coupled with the DC bus, i.e. the input power source. Third input pin FB is coupled with the output terminal of the voltage feedback circuit. Second input pin SEN is coupled with the output terminal of the current sampling circuit. Ground pin GND is coupled with the first terminal of the primary winding. The current sampling circuit is coupled between power output pin P2 and the first terminal of primary winding. When the current sampling circuit adopts a resistor coupled between power output terminal P2 and the first terminal of the primary winding, power output pin P2 is coupled with second input pin SEN, or integrated circuit IC2 adopts a configuration of encapsulating output pin P2 and second input pin SEN as a single pin.

Meanwhile, in the present embodiment, capacitor Cb in the bias voltage generating circuit or preferably adopted resistor Rst may be required to be adjustable in accordance with different parameters of the isolated power converter, so by adopting them as discrete components and integrating charging controller 211 of the bias voltage generating circuit in the integrated circuit, the compatibility of the integrated circuit is enhanced.

In this case, the isolated power converter in accordance with the present embodiment may utilize the existing self-powered integrated circuit for controlling a power stage of the isolated power converter. In other words, the isolated power converter may be constructed by using an integrated circuit with a charging controller and a control circuit or an integrated circuit with a charging controller, a control circuit and a power switch, which are shown in FIGS. 5C and 5D respectively.

Figure 5C:
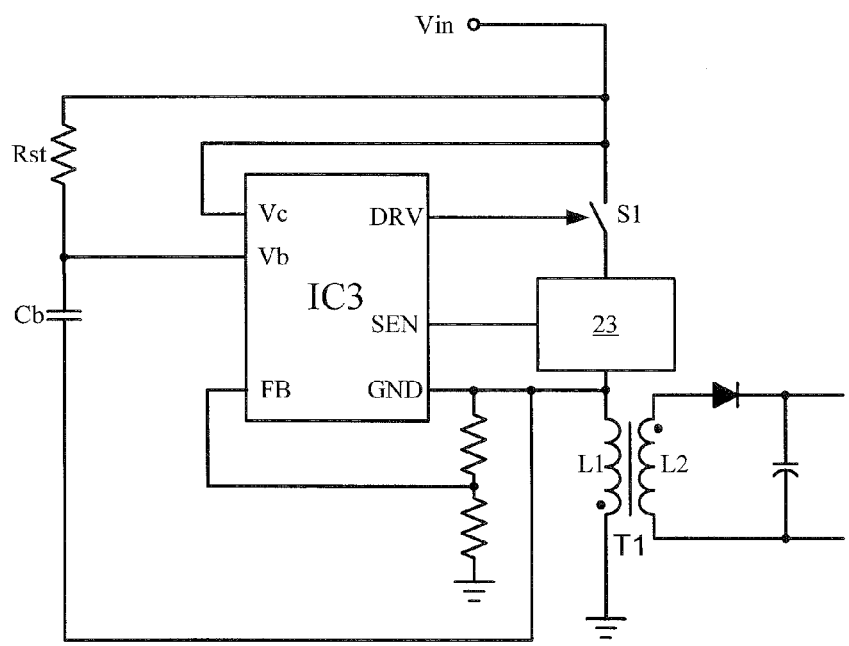

As shown in FIG. 5C, integrated circuit IC3 with a charging controller and a control circuit comprises output pin DRV, first input pin Vc, bias voltage pin Vb, second input pin SEN, third input pin FB, and ground pin GND. Output pin DRV is coupled with the control terminal of power switch S1. Bias voltage pin Vb is coupled with a common terminal at which resistor Rst and capacitor Cb are coupled with each other. First input pin Vc is coupled with the DC bus, i.e. input power source. Third input pin FB is coupled with the output terminal of the voltage feedback circuit. Second input pin SEN is coupled with the output terminal of the current sampling circuit. Ground pin GND is coupled with the first terminal of the primary winding. Wherein, bias voltage pin Vb is coupled with the output terminal of the charging controller and capacitor Cb.

Figure 5D:
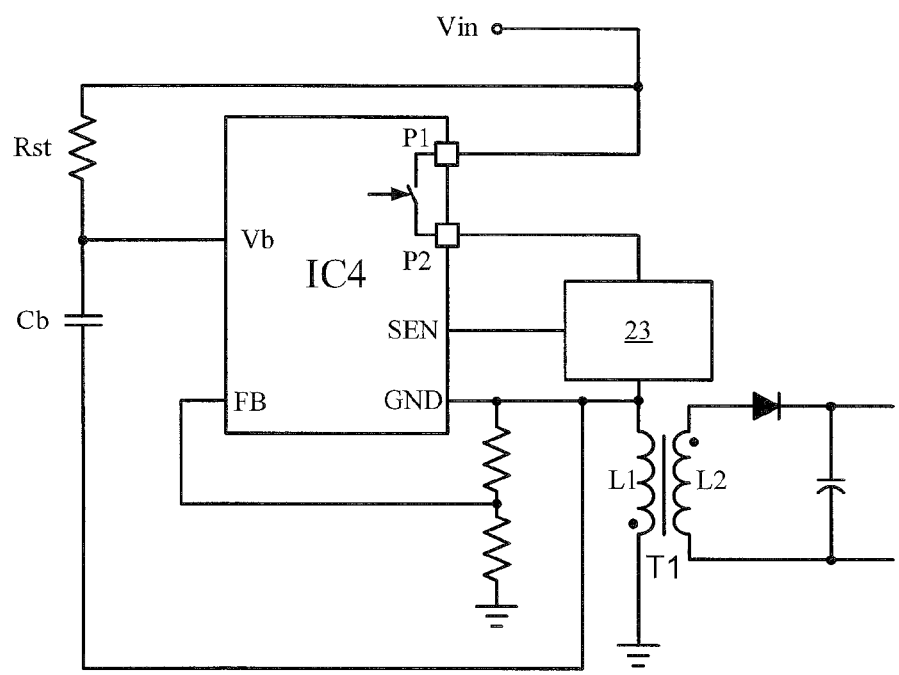

As shown in FIG. 5D, integrated circuit IC4 with a charging controller, a control circuit and a power switch comprises power input pin P1, power output pin P2, bias voltage pin Vb, second input pin SEN, third input pin FB and ground pin GND. Second input pin SEN is coupled with the second terminal of the power switch in the integrated circuit, or, the second terminal of the power switch and second input terminal SEN are encapsulated as a single pin. Meanwhile, because the power switch is integrated in the integrated circuit, the input terminal of the charging controller is coupled with the first terminal of the power switch in the integrated circuit. Thus, the integrated circuit typically does not have an independent first input pin. The isolated power converter adopting this kind of integrated circuits is shown in FIG. 5D, wherein power input pin P1 is coupled to the input power source. Bias voltage pin Vb is coupled with capacitor Cb. Third input pin FB is coupled with the output terminal of the voltage feedback circuit. Second input pin SEN is coupled with the output terminal of the current sampling circuit. Ground pin GND is coupled with the first terminal of the primary winding. The current sampling circuit is coupled between power output pin P2 and the first terminal of primary winding. When the current sampling circuit adopts a resistor coupled between power output pin P2 and the first terminal of the primary winding, power output pin P2 is coupled with second input pin SEN, or integrated circuit IC4 adopts a configuration of encapsulating power output pin P2 and second input pin SEN as a single pin.

It is to be understood by those skilled in the art that, in the circuits shown by FIG. 5A-5D, though integrated circuits IC1-IC4 have different parts of the circuit shown in FIG. 2A fabricated therein which represents different integrated circuit package configurations, the circuits shown in FIG. 5A-5D are the same with that shown in FIG. 2A.

In accordance with the teaching of the present embodiment, existing integrated circuit for controlling isolated power converters can be applied to construct an isolated power converter without employing an auxiliary winding.

Figure 6:
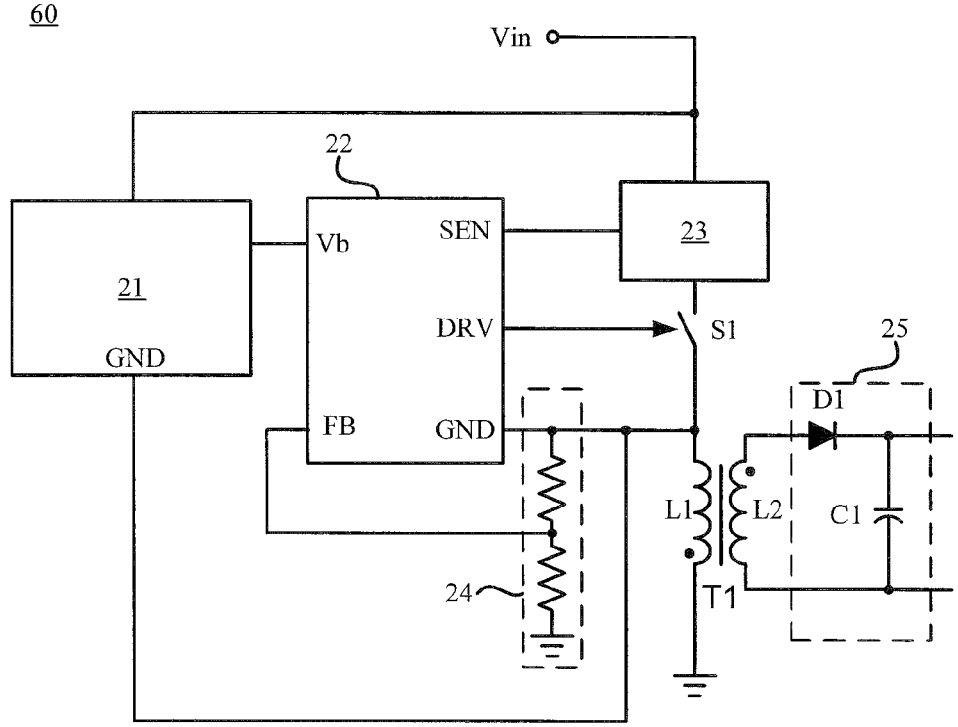
FIG. 6 is a schematic diagram of an isolated power converter in accordance with a second embodiment of the present disclosure.

FIG. 6 is a schematic diagram of an isolated power converter in accordance with a second embodiment of the present disclosure. Corresponding reference characters indicate corresponding components in FIG. 6. As shown in FIG. 6, isolated power converter 60 comprises transformer T1, power switch S1, bias voltage generating circuit 21, control circuit 22, current sampling circuit 23, voltage feedback circuit 24 and secondary rectifier 25. Transformer T1 comprises only primary winding L1 and secondary winding L2 coupled with each other and excludes the auxiliary winding. Secondary rectifier 25 is coupled with secondary winding L2.

Power switch S1 and current sampling circuit 23 are coupled in series between input power source Vin and a first terminal of primary winding L1. A second terminal of primary winding L1 is coupled with the ground. Current sampling circuit 23 samples the current though the power switch to output a current detection signal.

In the present embodiment, power switch S1 may be any controlled semiconductor switch device such as MOSFET (Metal Oxide Semiconductor Field Effect Transistor). When power switch S1 adopts a MOSFET, a first terminal of power switch S1 may be a drain of the MOSFET, and a second terminal of power switch S1 may be a source of the MOSFET.

Voltage feedback circuit 24 is coupled between the first terminal and the second terminal of primary winding L1 and configured to output a feedback voltage in accordance with a voltage across primary winding L1.

Output terminals of current sampling circuit 23 and voltage feedback circuit 24 are respectively coupled with second input terminal SEN and third input terminal FB of control circuit 22.

Bias voltage generating circuit 21 is coupled with input power source and configured to generate a substantially constant bias voltage for powering control circuit 22.

Preferably, bias voltage generating circuit 21 comprises capacitor Cb and charging controller 211. Charging controller 211 is coupled with the input power source and configured to utilize the energy from the DC bus to provide the bias voltage by charging capacitor Cb.

Furthermore, capacitor Cb may be coupled to the DC bus (i.e. the input power source) by resistor Rst, which enables the energy from the DC bus to charge capacitor Cb through resistor Rst to obtain bias voltage Vb powering and starting control circuit 22 when the isolated power converter need to be started.

Different from the first embodiment, in the present embodiment, current sampling circuit 23 is coupled between the input power source and the first terminal of power switch S1. The second terminal of power switch S1 is coupled with the first terminal of the primary winding. Current sampling circuit 23 samples the current through power switch S1 to generate a current detection signal to be fed back to control circuit 22.

Preferably, current sampling circuit 23 comprises resistor Rsen coupled between the input power source and the first terminal of power switch S1 and outputs a current detection signal proportional to a voltage drop across resistor Rsen.

Control circuit 22 comprises ground terminal GND coupled with the first terminal of the primary winding.

Output terminal DRV of control circuit 22 is coupled with a control terminal of power switch S1, and control circuit 22 is configured to output switching control signal Q in accordance with the current detection signal and the feedback voltage. Switching control signal Q is configured to control on and off of power switch S1, so as to enable the isolated power converter to output a substantially constant voltage or current.

Voltage feedback circuit 24 is coupled in parallel with primary winding L1 and configured to output feedback voltage.

Preferably, voltage feedback circuit 24 is a voltage dividing resistor loop coupled in parallel with primary winding L1.

Similar to the first embodiment, the ground terminal of bias voltage generating circuit 21 is coupled to the first terminal of the primary winding, so bias voltage generating circuit 21 is actually coupled between the input power source and the first terminal of the primary winding and utilizes a voltage drop across a series circuit consisting of the power switch and the current sampling circuit to generate bias voltage Vb. Therefore, the existing bias voltage generating circuit may be applied to the present embodiment without any modification. In other words, bias voltage generating circuit may adopt any circuit configuration which generates the bias voltage without employment of an auxiliary winding, such as the circuit shown in FIG. 3B, which will not be described herein.

With respect to the present embodiment, current sampling circuit 23 outputs the current detection signal representing the current through the power switch, and voltage feedback circuit 24 feeds back the voltage across the primary winding proportional to the voltage across an auxiliary winding in the prior art. Thus, by configuring current sampling circuit 23 and voltage feedback circuit 24, the current detection signal and the feedback voltage inputted to control circuit 22 can representing the operation state of the isolated power converter. Therefore, similar to the bias voltage generating circuit, the control circuit in the prior art can be applied to the isolated power converter in accordance with the present embodiment without any modification.

In this case, the isolated power converter in accordance with the present embodiment may utilize the existing self-powered integrated circuit for controlling a power stage of the isolated power converter. In other words, the isolated power converter may be constructed by using an integrated circuit with a bias voltage generating circuit and a control circuit, or an integrated circuit with a bias voltage generating circuit, a control circuit and a power switch, or an integrated circuit with a charging controller and a control circuit, or an integrated circuit with a charging controller, a control circuit and a power switch.

In the present embodiment, the positions of the power switch and the primary winding are exchanged, and the feedback voltage detection and secondary current zero-crossing detection is carried out in accordance with the voltage across the primary winding. Thus, the auxiliary winding is omitted. Furthermore, the advantages of simplified manufacture process, low cost, small size of the circuit, and enhanced electromagnetic compatibility are achieved.

Figure 7:
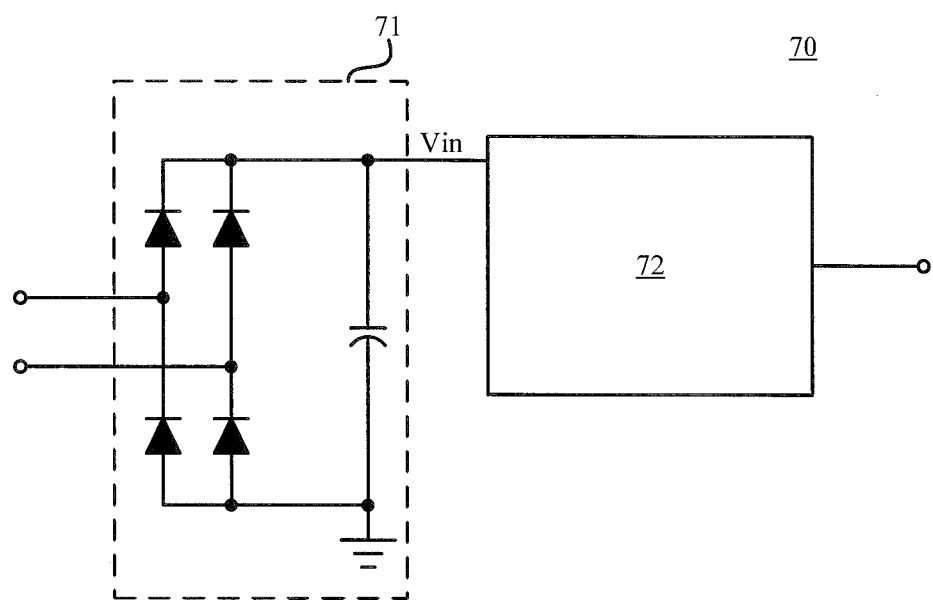
FIG. 7 is a schematic diagram of a switching power supply in accordance with an embodiment of the present disclosure.

As shown in FIG. 7, the isolated power converter in accordance with the first embodiment and the second embodiment may be employed to construct switching power supply 70 for AC-DC power conversion. Switching power supply 70 comprises rectifier bridge 71 and isolated power converter 72 in accordance with the first embodiment or the second embodiment.

The switching power supply adopts the isolated power converter without any auxiliary winding. Thus the advantages of simplified manufacture process, low cost, small size of the circuit, and enhanced electromagnetic compatibility are achieved.

While embodiments of this disclosure have been shown and described, it will be apparent to those skilled in the art that more modifications are possible without departing from the spirits herein. The disclosure, therefore, is not to be restricted except in the spirit of the following claims.

We claim:

1. An isolated power converter, comprising:
   a transformer with a primary winding and a secondary winding;
   a secondary rectifier coupled with said secondary winding;
   a power switch and a current sampling circuit coupled in series between an input power source and a first terminal of said primary winding, wherein a second terminal of said primary winding is coupled with a ground, wherein said current sampling circuit is configured to sample a current through said power switch to output a current detection signal;
   a voltage feedback circuit coupled in parallel with said primary winding and configured to output a feedback voltage in accordance with a voltage across said primary winding;
   a bias voltage generating circuit coupled with said input power source and configured to provide a bias voltage for said control circuit; and
   a control circuit configured to output switching control signal in accordance with said current detection signal and said feedback voltage, and said control circuit is powered by said bias voltage;
   wherein, both ground terminals of said control circuit and said bias voltage generating circuit are coupled with said first terminal of said primary winding.

2. The isolated power converter of claim 1, wherein, a first terminal of said power switch is coupled with said input power source, wherein said current sampling circuit is coupled between a second terminal of said power switch and said first terminal of said primary winding.

3. The isolated power converter of claim 2, wherein, said current sampling circuit comprises a resistor, wherein said current detection signal is outputted at a common terminal coupling said resistor and said power switch.

4. The isolated power converter of claim 1, wherein, said current sampling circuit is coupled between said input power source and a first terminal of said power switch, wherein a second terminal of said power switch is coupled with said first terminal of said primary winding.

5. The isolated power converter of claim 4, wherein, said current sampling circuit comprises a resistor, wherein a voltage drop across said resistor is adopted as said current detection signal.

6. The isolated power converter of claim 1, wherein, said bias voltage generating circuit comprises a capacitor coupled between an output terminal and said ground terminal of said bias voltage generating circuit and a charging controller coupled between said output terminal and said input power source.

7. The isolated power converter of claim 6, wherein, said bias voltage generating circuit further comprises a resistor coupled between said input power source and said output terminal.

8. The isolated power converter of claim 1, wherein, said bias voltage generating circuit and said control circuit are integrated as a self-powered integrated circuit; or
   said bias voltage generating circuit, said control circuit and said power switch are integrated as a self-powered integrated circuit.

9. The isolated power converter of claim 6, wherein, said charging controller and said control circuit are integrated as a self-powered integrated circuit; or said charging controller, said control circuit and said power switch are integrated as a self-powered integrated circuit.

10. A switching power supply, comprising:
a rectifier bridge; and
an isolated power converter comprising:
a transformer with a primary winding and a secondary winding; a secondary rectifier coupled with said secondary winding;
a power switch and a current sampling circuit coupled in series between said rectifier bridge and a first terminal of said primary winding, wherein a second terminal of said primary winding is coupled with a ground, wherein said current sampling circuit is configured to sample a current through said power switch to output a current detection signal;
a voltage feedback circuit coupled in parallel with said primary winding and configured to output a feedback voltage in accordance with a voltage across said primary winding;
a bias voltage generating circuit coupled with said rectifier bridge and configured to provide a bias voltage for said control circuit; and
a control circuit configured to output switching control signal in accordance with said current detection signal and said feedback voltage;
wherein, both ground terminals of said control circuit and said bias voltage generating circuit are coupled with said first terminal of said primary winding.

11. The switching power supply of claim 10, wherein, a first terminal of said power switch is coupled with said rectifier bridge, wherein said current sampling circuit is coupled between a second terminal of said power switch and said first terminal of said primary winding.

12. The switching power supply of claim 11, wherein, said current sampling circuit comprises a resistor, wherein said current detection signal is outputted at a common terminal coupling said resistor and said power switch.

13. The switching power supply of claim 10, wherein, said current sampling circuit is coupled between said rectifier bridge and a first terminal of said power switch, wherein a second terminal of said power switch is coupled with said first terminal of said primary winding.

14. The switching power supply of claim 4, wherein, said current sampling circuit comprises a resistor, wherein a voltage drop across said resistor is adopted as said current detection signal.

15. The switching power supply of claim 10, wherein, said bias voltage generating circuit comprises a capacitor coupled between an output terminal and said ground terminal of said bias voltage generating circuit and a charging controller coupled between said output terminal and said rectifier bridge.

16. The switching power supply of claim 15, wherein, said bias voltage generating circuit further comprises a resistor coupled between said rectifier bridge and said output terminal.

17. The switching power supply of claim 10, wherein, said bias voltage generating circuit and said control circuit are integrated as a self-powered integrated circuit; or
said bias voltage generating circuit, said control circuit and said power switch are integrated as a self-powered integrated circuit.

18. The isolated power converter of claim 15, wherein, said charging controller and said control circuit are integrated as a self-powered integrated circuit; or
said charging controller, said control circuit and said power switch are integrated as a self-powered integrated circuit.

* * * * *